United States Patent
Souza et al.

(10) Patent No.: US 8,677,873 B2
(45) Date of Patent: Mar. 25, 2014

(54) BAND SAW BLADE WITH INTERIOR TEETH

(75) Inventors: John Souza, Eugen, OR (US); Ross Souza, Eugene, OR (US); Rod Souza, Junction City, OR (US)

(73) Assignee: Eugene Carbide Saw Service, Inc., Eugene, OR (US)

( * ) Notice: Subject to any disclaimer, the term of this patent is extended or adjusted under 35 U.S.C. 154(b) by 991 days.

(21) Appl. No.: 12/288,747

(22) Filed: Oct. 22, 2008

(65) Prior Publication Data

US 2009/0044679 A1    Feb. 19, 2009

Related U.S. Application Data

(62) Division of application No. 10/352,332, filed on Jan. 27, 2003, now Pat. No. 7,451,677.

(51) Int. Cl.
*B27B 33/02*     (2006.01)
*B27B 33/14*     (2006.01)

(52) U.S. Cl.
USPC ................ 83/835; 83/661; 83/837; 83/855

(58) Field of Classification Search
USPC ........... 83/835, 661, 837, 854, 855, 666, 350, 83/663, 651, 676, 846; 56/13.7, 255, 503, 56/295, DIG. 17, DIG. 20, 17.5, 15.2, 15.9, 56/15.5; D8/20, 9, 70, 95; 30/347, 276, 30/355, 166.3, 380; 125/13.01, 22
See application file for complete search history.

(56) References Cited

U.S. PATENT DOCUMENTS

| | | | |
|---|---|---|---|
| 1,203 A | 6/1839 | Morgan | |
| 58,570 A | 10/1866 | Arnold | |
| 77,489 A | 5/1868 | Anderson | |
| 149,932 A | 4/1874 | Hogeland | |
| 284,793 A | 9/1883 | Allaben | |
| 297,816 A | 4/1884 | Ledward | |
| 300,805 A | 6/1884 | Scott | |
| 301,841 A * | 7/1884 | Troeme-Becker | 83/837 |
| 309,550 A | 12/1884 | Ledward | |
| 342,535 A | 5/1886 | Perkins | |
| 411,189 A * | 9/1889 | Grey | 83/838 |
| 690,678 A * | 1/1902 | Thomas | 83/661 |
| 788,236 A | 4/1905 | Bartholomew | |
| 817,568 A | 4/1906 | Huther | |
| 1,081,135 A | 12/1913 | Nelson | |
| 1,343,276 A | 6/1920 | Olson et al. | |
| 1,447,608 A | 3/1923 | Wasser et al. | |
| 1,906,660 A * | 5/1933 | Taylor | 83/837 |
| 2,214,827 A * | 9/1940 | Boe et al. | 83/855 |

(Continued)

FOREIGN PATENT DOCUMENTS

| | | | |
|---|---|---|---|
| FR | 82 02600 | 8/1982 | |
| GB | 002179593 A * | 3/1987 | B23D 61/00 |

*Primary Examiner* — Ghassem Alie
(74) *Attorney, Agent, or Firm* — Chernoff, Vilhauer, McClung & Stenzel, LLP

(57) ABSTRACT

A planar band saw blade having an outer cutting edge with a plurality of saw teeth also includes sets of secondary teeth placed in cutout portions along a centerline of the band saw blade. The secondary tooth sets provide portions within the body of the saw blade that provide additional cutting action that reinforces the primary outer cutting edge of the blade. The band saw blade may include teeth on each parallel edge and the interior tooth sets in each cutout portion alternatively point toward opposite edges.

3 Claims, 3 Drawing Sheets

(56) References Cited

U.S. PATENT DOCUMENTS

| | | |
|---|---|---|
| 2,546,947 A | 9/1948 | Miller, Sr. |
| 2,606,584 A | 8/1952 | Derr |
| 2,659,398 A | 11/1953 | Marvin |
| 2,850,056 A * | 9/1958 | Kehl ............... 83/848 |
| 3,176,455 A | 4/1965 | Buchanan |
| 3,194,285 A * | 7/1965 | Reinhart et al. ............ 30/166.3 |
| 3,194,825 A | 7/1965 | Reinhart et al. |
| 3,299,917 A | 1/1967 | Pearson |
| 3,495,640 A | 2/1970 | Gluckstein at al. |
| 3,519,040 A | 7/1970 | Demsky |
| 3,521,684 A | 7/1970 | McRobert et al. |
| 3,730,038 A | 5/1973 | Farb |
| 3,852,881 A | 12/1974 | Treace |
| 3,879,825 A | 4/1975 | Jensen et al. |
| 4,068,688 A | 1/1978 | Benson |
| 4,083,166 A | 4/1978 | Haas |
| 4,123,958 A * | 11/1978 | Wright et al. ................ 83/837 |
| 4,180,110 A | 12/1979 | Tauscher |
| 4,317,299 A | 3/1982 | Funk |
| 4,641,562 A | 2/1987 | Clarke |
| 5,063,980 A | 11/1991 | Schultz |
| 5,259,428 A | 11/1993 | Matthews |
| 5,291,725 A | 3/1994 | Meinerding |
| 5,361,570 A | 11/1994 | Bernardy |
| 5,515,670 A | 5/1996 | Meinerding |
| 5,875,700 A | 3/1999 | Powell |
| 6,109,551 A | 8/2000 | Sullivan |
| 6,145,426 A | 11/2000 | Ward et al. |
| 6,367,533 B1 | 4/2002 | Pitzen |
| 6,427,568 B1 | 8/2002 | Gebelius et al. |
| 6,464,015 B1 | 10/2002 | Jones |
| 7,451,677 B2 | 11/2008 | Souza et al. |
| 2004/0187320 A1 * | 9/2004 | Haut ............... 30/355 |
| 2006/0016315 A1 * | 1/2006 | Zorich et al. ............ 83/835 |
| 2007/0144325 A1 | 6/2007 | Souza et al. |

* cited by examiner

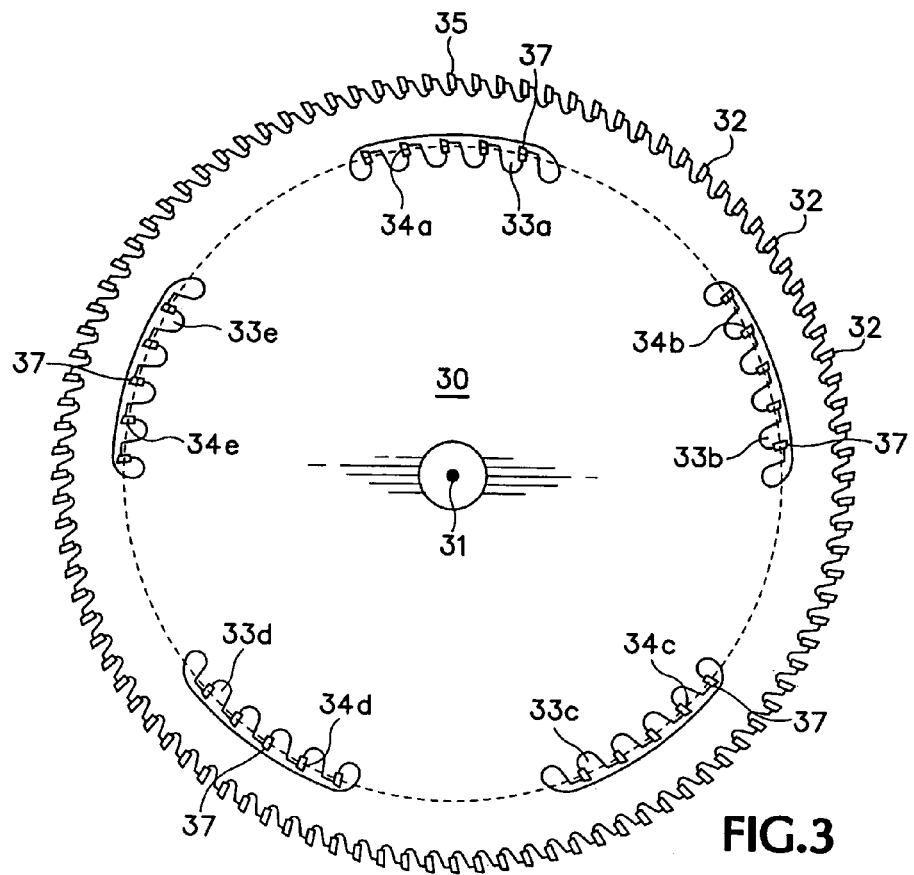
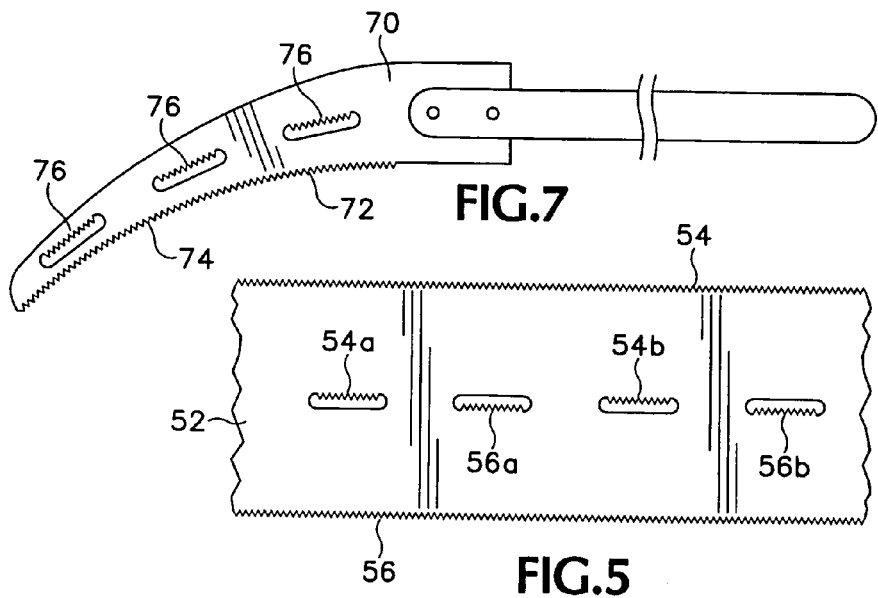

BAND SAW BLADE WITH INTERIOR TEETH

CROSS-REFERENCE TO RELATED APPLICATIONS

This application is a divisional application of U.S. patent application Ser. No. 10/352,332 filed Jan. 27, 2003 now U.S. Pat. No. 7,451,677.

STATEMENT REGARDING FEDERALLY SPONSORED RESEARCH OR DEVELOPMENT

Not applicable.

NAMES OF PARTIES TO A JOINT RESEARCH AGREEMENT

Not applicable.

REFERENCE TO SEQUENCE LISTING, A TABLE, OR A COMPUTER PROGRAM LISTING COMPACT DISC APPENDIX

Not applicable.

BACKGROUND OF THE INVENTION

Field of the Invention

This invention relates to saw blades of the type generally used for cutting wood and other products. Such products may include lumber, layered wood products such as plywood or logs or posts, and non-wood products such as plastic, masonry and nonferrous metals.

The typical construction of a saw blade is a planar piece of metal with an outer cutting edge. The cutting edge typically contains serrations arranged as forwardly inclined teeth. In circular saw blades that operate at very high speeds and with industrial band saws, the serrations may have hardened carbide tips.

Saw blades are planar but the serrations and teeth making up the working edge of the saw blade generally protrude to either side of the plane of the blade. This defines the width of the cut of the blade or "kerf." The cutting action of the teeth produces chips and sawdust. These chips may become lodged in the kerf. It would be more efficient if there were some way to expel the chips as the blade advanced because the presence of chips in the kerf means that the saw is working less efficiently and requires more horsepower.

In addition, as the saw progresses deeper into the cut, more energy is expended. There is more cutting product in the cut and consequently more friction for the saw blade. Friction, in turn, creates heat and possibly vibration. If the workpiece happens to vibrate at the correct frequency, there can even be breakage of carbide saw tooth tips.

Also, depending upon the number of teeth per inch, the pitch of the teeth and their overall size, the actual cut itself may be rough or smooth. In some applications, it is desirable to have a very smooth surface where the cut is made. In general however, in order to have a smooth surface, the teeth must be smaller and more numerous per lineal length, but this choice may require sacrificing both speed and efficiency.

In the past, circular saw blades have been designed which included cutout squares placed along an interior diameter one hundred-eighty degrees apart with inserted carbide tips. This design was an attempt to provide a means for clearing sawdust from the kerf but such designs have proved unsatisfactory.

BRIEF SUMMARY OF THE INVENTION

A planar band saw blade having an outer cutting edge with a plurality of saw teeth also includes sets of secondary teeth placed in cutout portions along a centerline of the band saw blade. The secondary tooth sets provide portions within the body of the saw blade that provide additional cutting action that reinforces the primary outer cutting edge of the blade. The band saw blade may include teeth on each parallel edge and the interior tooth sets in each cutout portion alternatively point toward opposite edges.

The foregoing and other objectives, features, and advantages of the invention will be more readily understood upon consideration of the following detailed description of the invention, taken in conjunction with the accompanying drawings.

BRIEF DESCRIPTION OF THE SEVERAL VIEWS OF THE DRAWINGS

FIG. 3 is a side view of a further alternative embodiment of the invention as used in a circular saw blade.

FIG. 5 is a partial cutaway side view of an embodiment of the invention used in a band saw blade.

FIG. 7 is a side view of a pruning saw employing the present invention.

DETAILED DESCRIPTION OF PREFERRED EMBODIMENT

Figure 1:
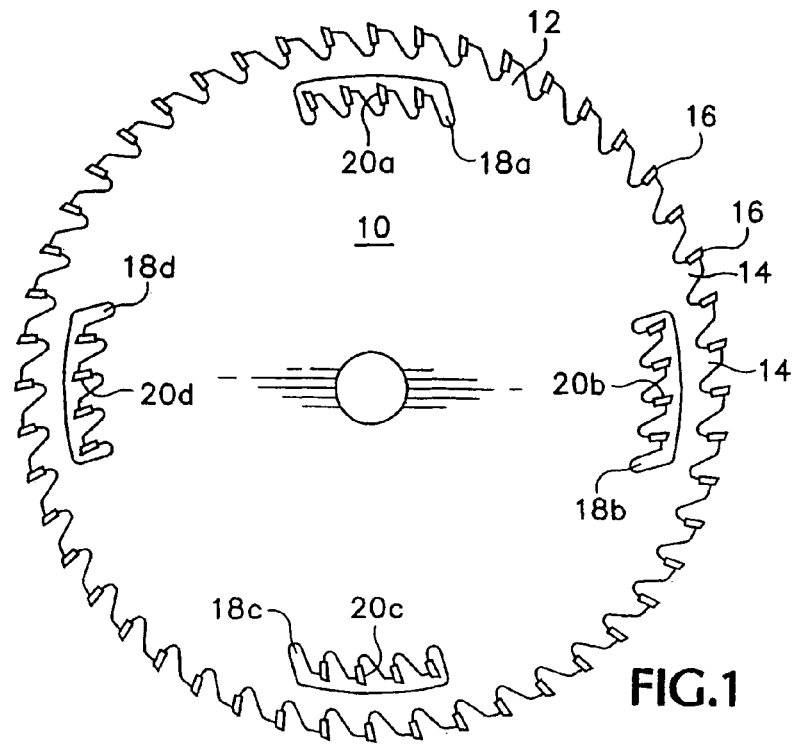
FIG. 1 is a side view of a circular saw blade employing a preferred embodiment of the present invention.

Referring to FIG. 1, a circular saw blade 10 has an outer perimeter 12. Distributed about the periphery of the outer perimeter are a number of saw blade teeth 14. Each of the teeth 14 have carbide tips 16. The blade 10 is a planar piece of metal and includes arcuate cutout portions 18a, 18b, 18c and 18d spaced 90° apart radially about an inner circumference of the blade 10 concentric with the outer perimeter 12. Each of the cutout portions 18a, 18b, 18c and 18d have a set of secondary teeth 20a, 20b, 20c and 20d respectively. Each of the sets of secondary teeth 20a, 20b, 20c and 20d have carbide tips, essentially the same as carbide tips 16 of the saw blade teeth 14. Each set of secondary teeth 20a, 20b, 20c and 20d consist of four teeth, and the spacing between the teeth in each secondary set of teeth is approximately the same as the spacing between the teeth 14 along the outer perimeter 12 of the blade 10.

The circular saw blade 30 has a center of rotation 31 and an outer radial edge 35. The outer radial edge has a plurality of saw teeth 32 spaced uniformly a predetermined distance apart. Interior cutout portions 33a-33e are spaced equal distances apart and lie generally along an inner circle concentric with the outer radial edge 35. Each cutout portion has a second plurality of secondary saw teeth 34a-34e. All of the secondary saw teeth in each of the cutout portions have tip portions 37 arranged along a common arc also concentric with the outer radial edge and are thus radially equidistant from the center of rotation 31 of the saw 30 as indicated by the dashed line.

The secondary cutting teeth 20a, 20b, 20c and 20d help the outer teeth 14 to cut more efficiently by providing a secondary cutting action that clears out chips that can fill the space occupied by the blade 10 and, by providing action along previously cut surfaces, smoothes the opposing surfaces of the material cut by the primary saw blade teeth 14 to make a finer, more finished cut.

Figure 2:
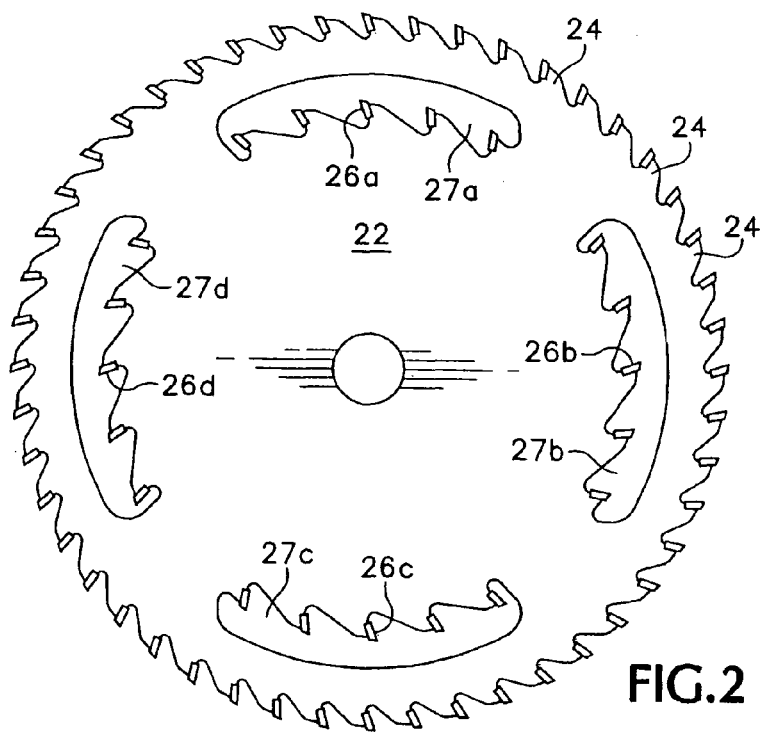
FIG. 2 is a side view of an alternative embodiment in a circular saw blade.

FIG. 2 shows another circular was blade 22 having outer teeth 24 with carbide tips. A plurality of sets of secondary teeth 26a, 26b, 26c and 26d are spaced 90° apart in cutout portions 27a, 27b, 27c and 27d along an inner circumference of the saw blade 22. There are five teeth in each of the sets 26a, 26b, 26c and 26d and these teeth have a deeper gullet and are spaced further apart than the primary teeth 24 along the outer circumference of the blade 22. The difference between this embodiment and the embodiment of FIG. 1 is that additional teeth in each set with a different gullet between teeth is better for cutting green lumber. The embodiment of FIG. 1 works best with dry lumber. In general, the denser the material, the more teeth are needed in the secondary set.

In FIG. 3, the saw blade 30 is designed for fine cutting action because it has a large number of teeth 32 about its outer perimeter. In the case of blade 30, however, there are five sets of secondary teeth 34a, 34b, 34c, 34d and 34e, which are spaced evenly 72° apart in arcuate cutouts 33a through 33e about an inner circumference of the blade 30. Each of the sets of secondary teeth contains five teeth each and these teeth have deeper gullets and are spaced further apart than the primary teeth 32. A greater number of sets of secondary teeth provides a finer cut or finish to the edges of the material being cut.

Figure 4:
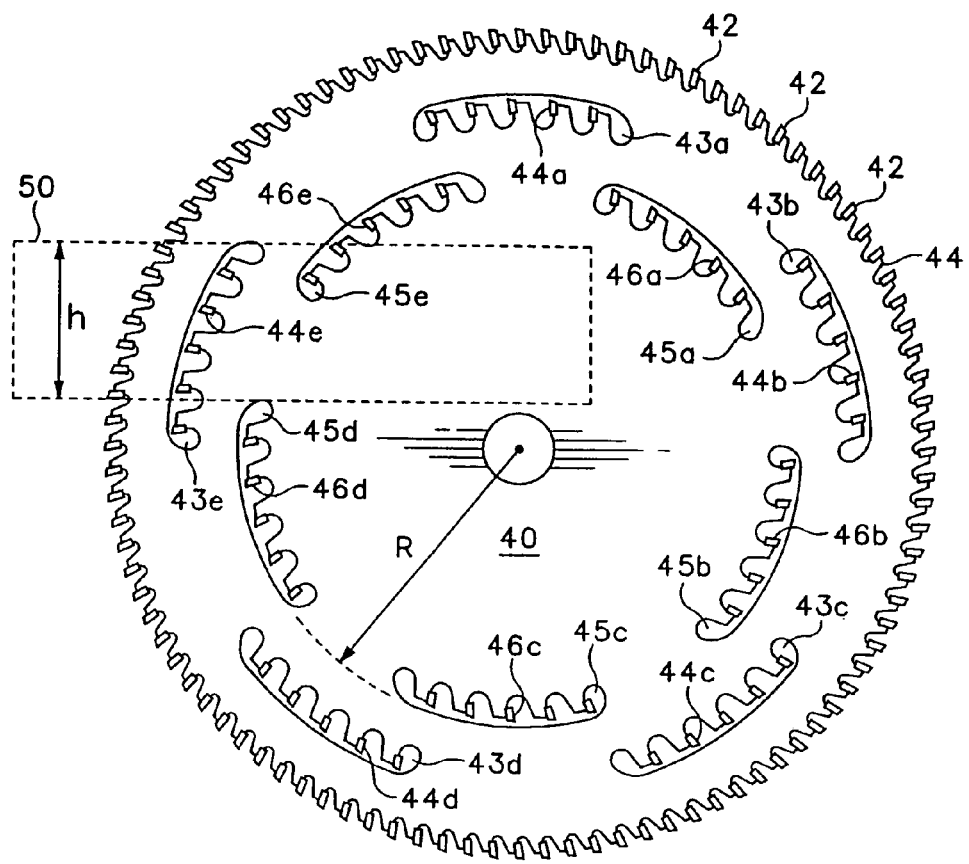
FIG. 4 is a side view of a fourth embodiment of the invention as used in a circular saw blade with an advancing workpiece shown in dashed outline.

Sometimes it is advantageous to include more than one secondary set of teeth. Such an embodiment is shown in FIG. 4. In FIG. 4, a blade 40 is designed for a relatively fine cut because it has a large number of primary teeth 42 arranged about its outer perimeter 44. A first grouping of secondary teeth consists of secondary tooth sets 44a, 44b, 44c, 44d and 44e arranged in cutouts 43a through 43e. As in FIG. 3, these cutouts are spaced 72° apart about an inner concentric circumference of the blade 40. To provide additional cutting action and a finer finish to the cut, tertiary sets of teeth 46a, 46b, 46c, 46d and 46e are positioned in arcuate cutouts 45a through 45e along a second inner concentric circumference spaced inwardly from the sets of secondary teeth 44a through 44e. Like the secondary sets, the tertiary tooth sets 46a through 46e each have five teeth. Each set of teeth 46a through 46e is spaced 72° apart but is placed offset from the secondary sets in the radial gaps between each set of secondary teeth. This placement properly balances the blade and maintains its structural integrity.

For each of the embodiments illustrated in FIGS. 1 through 4, the placement of the sets of secondary saw teeth is determined by several factors. The sets of secondary saw teeth are distributed about an imaginary circumferential arc which exists at a secondary radius which is less than the outer radius of the blade itself. This secondary radius must be greater than the height of the material that is to be cut. For example, in a twenty-inch saw blade designed to cut a stack of pieces of lumber six inches high, the inner or secondary radius must be greater than six inches. As a practical matter, in order to preserve the integrity of the blade, the radius should be greater than this and should be longer than the height of the material to be cut by an inch or more. For structural integrity, the secondary radius should usually be greater than half the distance from the center of the blade to its outer perimeter.

FIG. 4, for example, shows a workpiece 50, which may be a board or piece of lumber having a height h. The workpiece slides along a table (not shown) in the direction of the arrow in FIG. 4 into the advancing teeth of the saw blade 40. As shown in FIG. 4, the tertiary sets of teeth 46a through 46e are placed evenly about an imaginary inner circumference defined by an inner radius "R" which has a dimension greater than the height h of the workpiece 50.

Other factors influencing the number of secondary sets of teeth and the number of teeth per set include the thickness of the subject workpiece and its density. In general, thicker pieces of lumber require more sets of secondary teeth including tertiary sets of teeth and denser materials require more sets of secondary teeth. Also, in general, the denser the material, the more teeth are required for each set. Thick green lumber would be appropriate for the embodiment of FIG. 4 while thinner board lumber or plywood might be more appropriate for the embodiment of FIG. 1. In addition, more sets of teeth with more teeth per set are appropriate when a finer cut is desired. For example, in FIG. 3, there are five sets of secondary teeth 34a through 34e with five teeth in each set. This is due to the fact that the pitch of the teeth 32 of saw blade 30 is much finer than the pitch of the saw teeth in either FIG. 1 or FIG. 2.

While the preferred embodiments have been described primarily in relation to circular saw blades, the invention may be used on other types of blades as well. In FIG. 5, a band saw blade 52 includes oppositely opposed outer edges 54 and 56 respectively. Secondary tooth sets are provided in cutout portions situated along the centerline of the blade 52. Secondary tooth sets 54a and 54b are oriented at the same angle as the teeth of the outer edge 54 while secondary tooth sets 56a and 56b have the same pitch and forward angle as outer edge 56.

Figure 6:
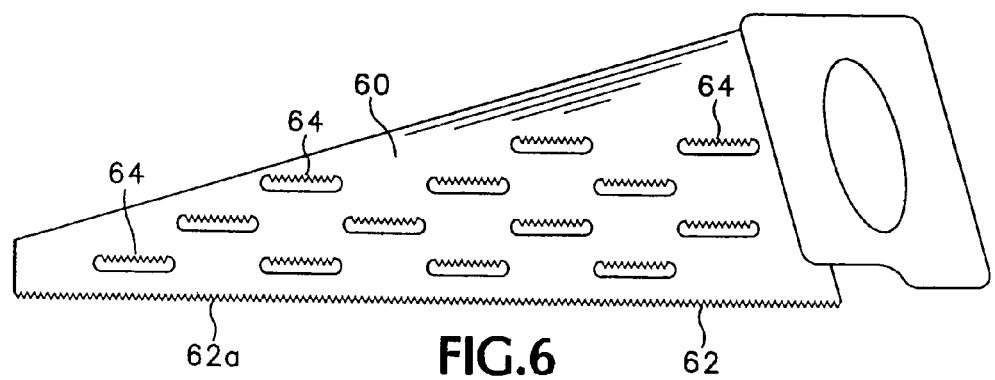
FIG. 6 is a side view of a handsaw employing the present invention.

Referring to FIG. 6, a handsaw 60 has a cutting edge 62 with a row of serrated cutting teeth 62a. Secondary toothed sets 64 are arranged in staggered fashion throughout the body of the planar saw blade 60 and extending generally parallel to the outer cutting edge 62.

Referring to FIG. 7, a pruning saw 70 includes a blade 72 having a serrated cutting edge 74 and three sets of secondary saw teeth 76.

As the examples of FIGS. 5, 6 and 7 show, the invention could be applied to virtually any type of saw which includes a planar saw blade that is wide enough to provide space and has the structural integrity for cutout portions which will support secondary sets of saw teeth.

For each set of secondary teeth illustrated in FIGS. 1 through 7, there are a plurality of teeth in each set and the plurality of teeth all have a uniform pitch and a uniform gullet. These features greatly enhance the saw's ability to expel chips and sawdust and make the blade cut substantially quieter.

The terms and expressions which have been employed in the foregoing specification are used therein as terms of description and not of limitation, and there is no intention, in the use of such terms and expressions, of excluding equivalents of the features shown and described or portions thereof, it being recognized that the scope of the invention is defined and limited only by the claims which follow.

We claim:

1. A band saw blade comprising a planar metal band having opposed parallel edges, each of said edges having a plurality of exterior saw teeth, said band saw blade further including interior cutout portions, each cutout portion having a pair of internal edges, each edge of said pair extending parallel to said opposed parallel edges and at least one of each said interior edge having a plurality of interior saw teeth.

2. The band saw blade of claim 1 wherein the interior cutout portions are situated substantially along a center axis line of said planar metal band.

3. The band saw blade of claim 2 wherein a first plurality of said interior cutout portions have interior teeth oriented in a first direction towards a first parallel edge and a second plurality of cutout portions have interior teeth oriented in a second direction toward a second parallel edge wherein the cutout portions in said first plurality are disposed alternately along the center axis line with cutout portions in said second plurality.

\* \* \* \* \*